United States Patent
Toulmay

[19]

[11] Patent Number: 6,142,738
[45] Date of Patent: Nov. 7, 2000

[54] BLADE FOR ROTARY WING AIRCRAFT

[75] Inventor: François Valentin Gaston Toulmay, Vitrolles, France

[73] Assignee: Eurocopter

[21] Appl. No.: 09/216,920

[22] Filed: Dec. 21, 1998

[30]     Foreign Application Priority Data

Dec. 22, 1997  [FR]  France ................................. 9716227

[51] Int. Cl.[7] .............................. B64C 11/16; B64C 27/46
[52] U.S. Cl. ................... 416/228; 416/223 R; 416/237; 416/238
[58] Field of Search .............................. 416/223 R, 228, 416/235, 237, DIG. 2, DIG. 5, 238

[56]      References Cited

U.S. PATENT DOCUMENTS

| | | | |
|---|---|---|---|
| 1,888,056 | 11/1932 | Verzillo et al. | 416/237 |
| 3,721,507 | 3/1973 | Monteleone | 416/228 |
| 4,046,336 | 9/1977 | Tangler . | |
| 4,248,572 | 2/1981 | Fradenburgh . | |
| 5,199,851 | 4/1993 | Perry et al. . | |

FOREIGN PATENT DOCUMENTS

| | | |
|---|---|---|
| 0482932 | 4/1992 | European Pat. Off. . |
| 0782956 | 7/1997 | European Pat. Off. . |
| 8812188 | 3/1990 | France . |

OTHER PUBLICATIONS

French Search Report dated Aug. 18, 1998.

*Primary Examiner*—Christopher Verdier
*Attorney, Agent, or Firm*—Stevens, Davis, Miller , Mosher, L.L.P.

[57]                ABSTRACT

A blade for a rotary wing aircraft includes a blade tip winglet intended to reduce the blade-vortex interaction noise during descending flight. The winglet has, in plan view, an at least approximately trapezoidal shape, and the mean value of a chord $C_1$ of the winglet is between 25% and 40% of a chord $C_0$ of the main part of the blade. Compared with a conventional rectangular tip, and for the same aerodynamic thrust, the reduction in noise associated with use of the blade tip winglet can be as much as 40%.

7 Claims, 4 Drawing Sheets

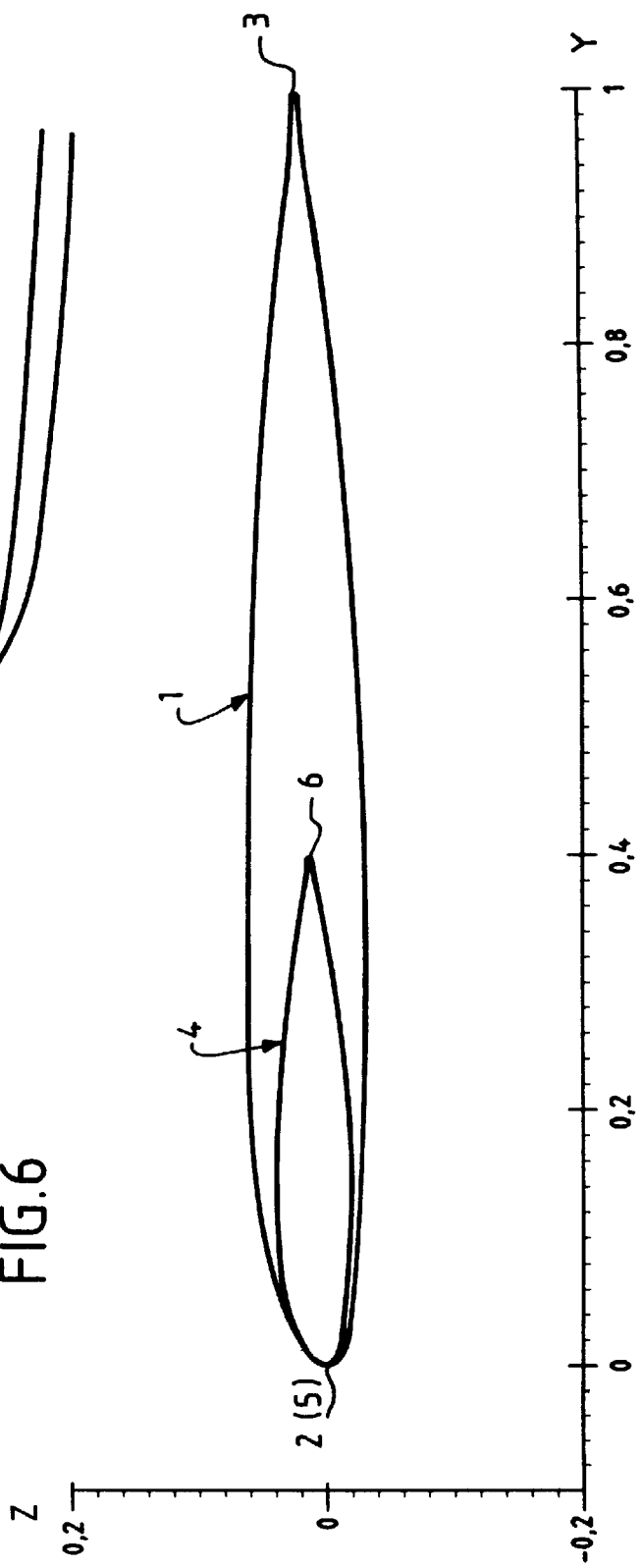

BLADE FOR ROTARY WING AIRCRAFT

BACKGROUND OF THE INVENTION

1. Field of the Invention

The present invention relates to a blade for a rotary wing aircraft, comprising a blade tip winglet intended to reduce the blade-vortex interaction noise in descending flight.

2. Description of Related Art

It is known that all types of aircraft in which lift is obtained by one or more rotors (conventional helicopters, autogyros, compound helicopters and tilt-rotor aircraft) generate, under certain descending-flight conditions, an intense pulsating noise known as the blade-vortex interaction noise, that is due to the blades meeting the intense blade-tip vortices emitted by these same blades during the previous revolutions of the rotor(s).

Numerous special-purpose designs and devices for the tips of the blades have been proposed in the attempt to eliminate or reduce the acoustic discomfort associated with this phenomenon, but so far with limited and not enough success. These efforts are illustrated by the inventions listed below:

(1) U.S. Pat. No. 4,046,336 "Vortex diffusion and dissipation", by J. L. Tangler (Bell-Textron), filed in 1975, (2) French Patent No. 88 12188 "Pale pour voilure tournante d'aéronef et voilure tournante comportant une telle pale [Blade for aircraft rotary wing and rotary wing comprising such a blade]", by A. Damongeot (Aérospatiale SNI), filed in 1988, (3) U.S. Pat. No. 5,199,851 "Helicopter rotor blades", by F. J. Perry & A. Brocklehurst (Westland Helicopters Ltd.), under United Kingdoms priority of 1990 (European Patent 0 482 932 A1).

Patent (1) proposes that a small straight winglet be fitted to the blade tip with a view to splitting the blade tip vortex into two weaker half-strength vortices. The short distance separating these two vortices allows them to recombine into a more spread out vortex before interacting with the next blades, yielding less abrupt pressure variations at the surface of the blades and a less pulsating noise. It has, however, been shown that, on the one hand, the excessively small size of the winglet (the chord is equal to 20% of that of the blade, and the span between 25 and 50% of the chord of the blade) probably does not allow two vortices of equal strengths to be obtained and that, on the other hand, the absence of twist in this winglet means that there is a risk that the air streams will detach at the junction with the actual blade, which will increase the drag and loss of performance.

Patent (2) proposes another principle aimed both at improving the performance and at reducing the noise: the distribution of lift along the span is modified in such a way as to very gradually reduce this lift toward the tip, and this eliminates or appreciably reduces the strength of the blade tip vortex under certain conditions, especially in hovering flight. This modification of the lift is obtained essentially by means of a local increase in the twist (more negative) according to a predefined relationship which can be adapted to suit the rectangular or otherwise shape of the tip, in plan view (chord relationship).

Patent (3), put forward as an improvement to Patent (1), again makes use of the principle of splitting the blade tip vortex, but recommends the use of a winglet of a far larger size both in the direction of the chord (equal to or greater than 50% of the chord of the blade) and in the direction of the span (between 4 and 8% of the radius of the rotor). In addition, twisting the winglet in the opposite direction to the twist in the blade is recommended so as to unload the region where the winglet and the blade meet and thus avoid any detachment. Offsetting the leading edge of the winglet forward (by the order of 15% of the chord with respect to the leading edge of the blade) is associated with a very pronounced sweeping of the winglet (an angle of 42° at the leading edge) with the intention of reducing the pitching moment of the blade as boundary layer detachment approaches. Finally, Patent (3) incorporates a slight positive dihedral angle (5° upward) and a change in profile along the winglet (tapering toward the end). However, there is no change in profile where the winglet meets the blade.

SUMMARY OF THE INVENTION

The present invention constitutes an improvement to the prior art, particularly the prior art as described above.

To this end, the blade for a rotary wing aircraft, comprising a blade tip winglet intended to reduce the blade-vortex interaction noise during descending flight, is noteworthy according to the invention, in that said winglet has, in plan view, an at least approximately trapezoidal shape, and in that the mean value of the chord of said winglet is between 25% and 40% of the chord of the main part of the blade.

This feature, possibly combined with the additional particular features which follow, makes it possible to appreciably reduce the aforementioned interaction noise, as will be seen later.

Advantageously, the expression defining the chord of the winglet has the following lower and upper limits:

| | Lower limit | | | Upper limit | |
|---|---|---|---|---|---|
| point | $(R-x)/C_0$ | $C_1/C_0$ | point | $(R-x)/C_0$ | $C_1/C_0$ |
| A | 1.00 | 1.00 | D | 0.60 | 1.00 |
| B | 1.00 | 0.35 | E | 0.60 | 0.40 |
| C | 0.00 | 0.15 | F | 0.00 | 0.40 |

In particular, the preferred expression defining the chord may be defined as follows:

| point | $(R-x)/C_0$ | $C_1/C_0$ |
|---|---|---|
| G | 0.80 | 1.00 |
| H | 0.80 | 0.40 |
| I | 0.00 | 0.20 |

As a preference, the angle at which the leading edge of the winglet is swept is between 20 and 30°, and may be either forward or backward.

Advantageously, the expression defining the twist associated with the winglet is linear, decreasing, and in continuation of that of the internal part of the blade.

As a preference, the leading edge of the blade, including the winglet maintains its continuity at the point where the chord changes.

BRIEF DESCRIPTION OF THE DRAWINGS

The figures of the appended drawings will make it easy to understand how the invention may be achieved. In these figures, identical references denote similar elements.

FIG. 6 illustrates the continuity of the leading edges of the blade and of the winglet according to the invention.

FIG. 7 shows an enlarged detail of FIG. 6.

DESCRIPTION OF THE PREFERRED EMBODIMENTS

Figure 1:
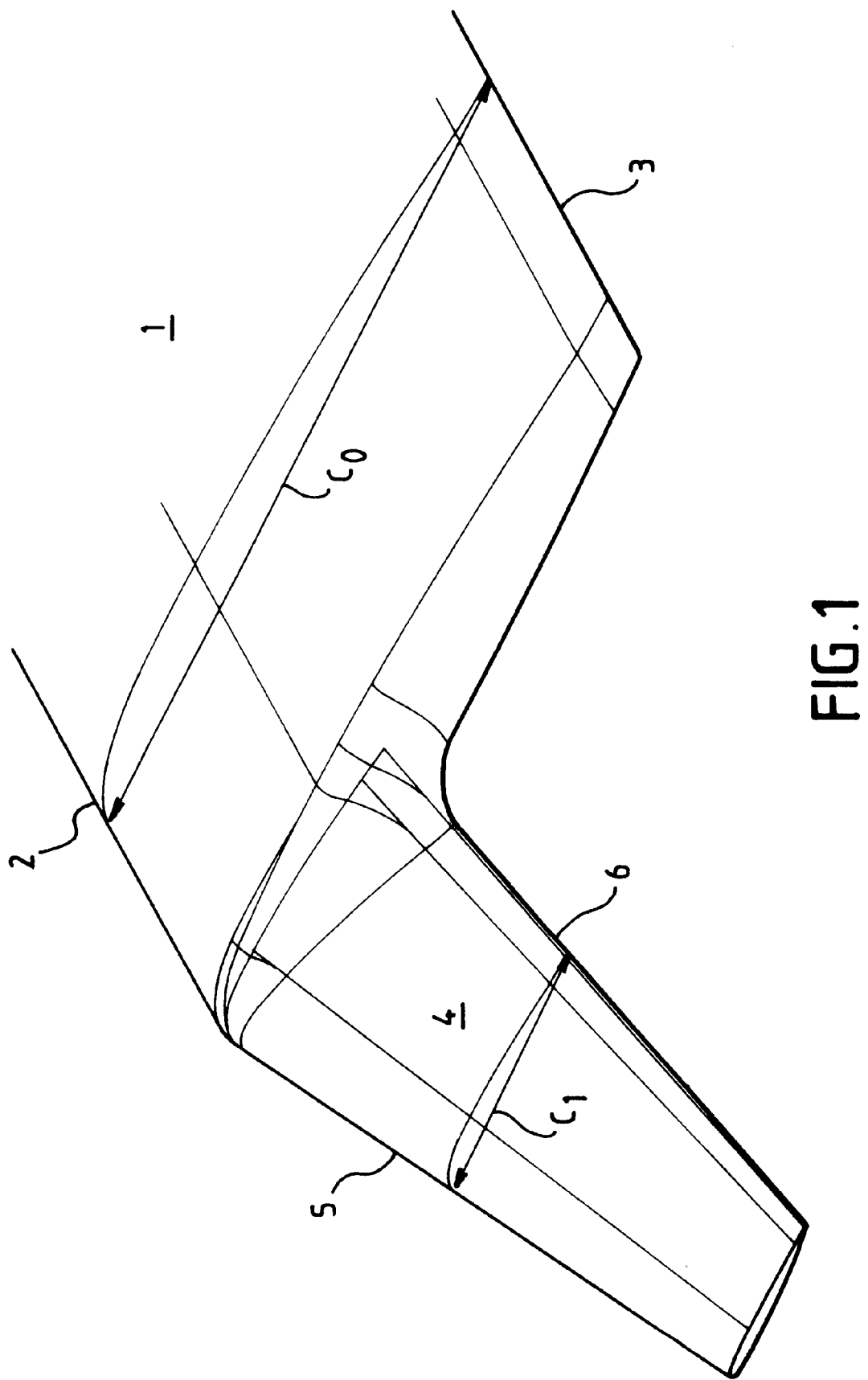
FIG. 1 is a diagrammatic perspective view of part of the tip of a blade for an aircraft rotary wing structure, comprising a winglet according to the invention.

Referring to FIG. 1, the blade 1 for a rotary wing aircraft (only part of the tip of which wing structure is illustrated in this figure) comprises, in the usual way, a leading edge 2 and a trailing edge 3, and is defined by a profile of determined chord $C_0$. As already mentioned, the blade 1 also has a blade tip winglet 4 intended to reduce the blade-vortex interaction noise in descending flight and likewise comprising a leading edge 5 and a trailing edge 6, and of which each successive section, at right angles to the span of the blade, is defined by a changing chord profile $C_1$.

In this regard, it will be noted that the span of the winglet 4 may represent a few percent (particularly from 4 to 8%) of the total span R of the blade.

Figure 3:
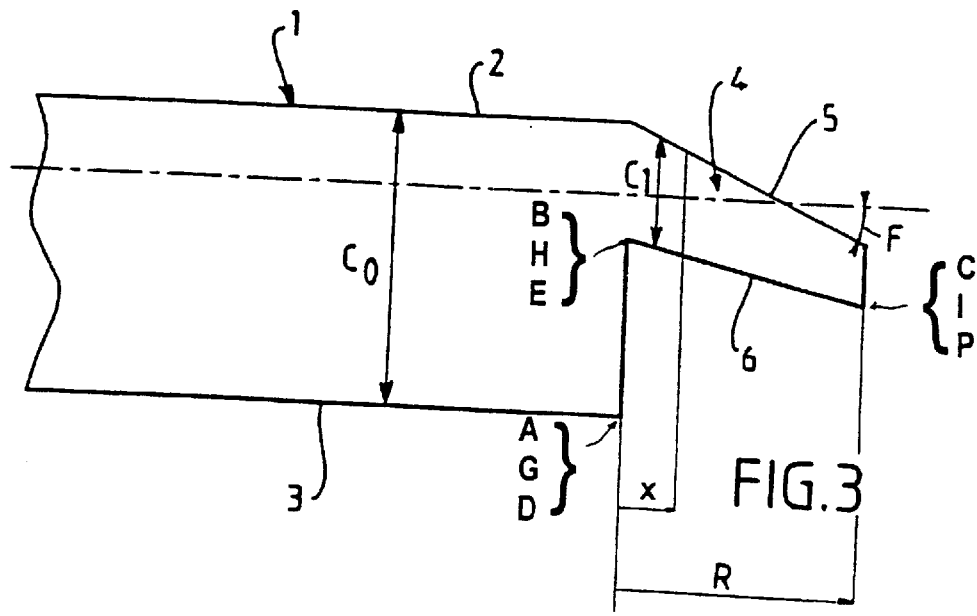
FIGS. 3 and 4 are two plan views of a blade tip exhibiting the winglet according to the invention.
Figure 4:
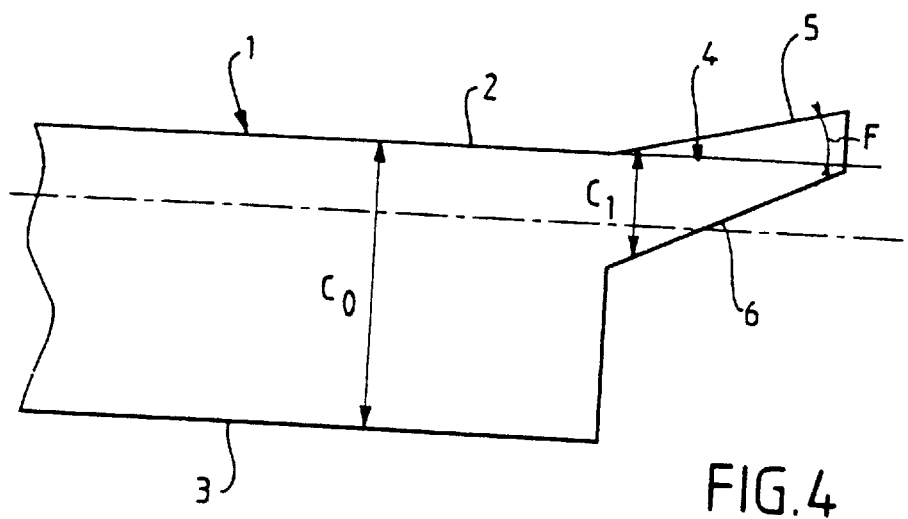

More specifically, the winglet 4 has, in plan view, an at least approximately trapezoidal shape, as can best be seen in FIGS. 3 and 4, and the mean value of the chord $C_1$ of the winglet 4 is between 25% and 40% of the chord $C_0$ of the main part of the blade.

In this context, the term "trapezoidal" needs to be considered in a wider sense, possibly, as will be seen later, encompassing a purely rectangular shape, while the idea of the "mean value of the chord" should be understood as being the mean of the value of the chord of the winglet where it meets the actual blade and of the value of the chord at the free tip of the winglet.

Figure 2:
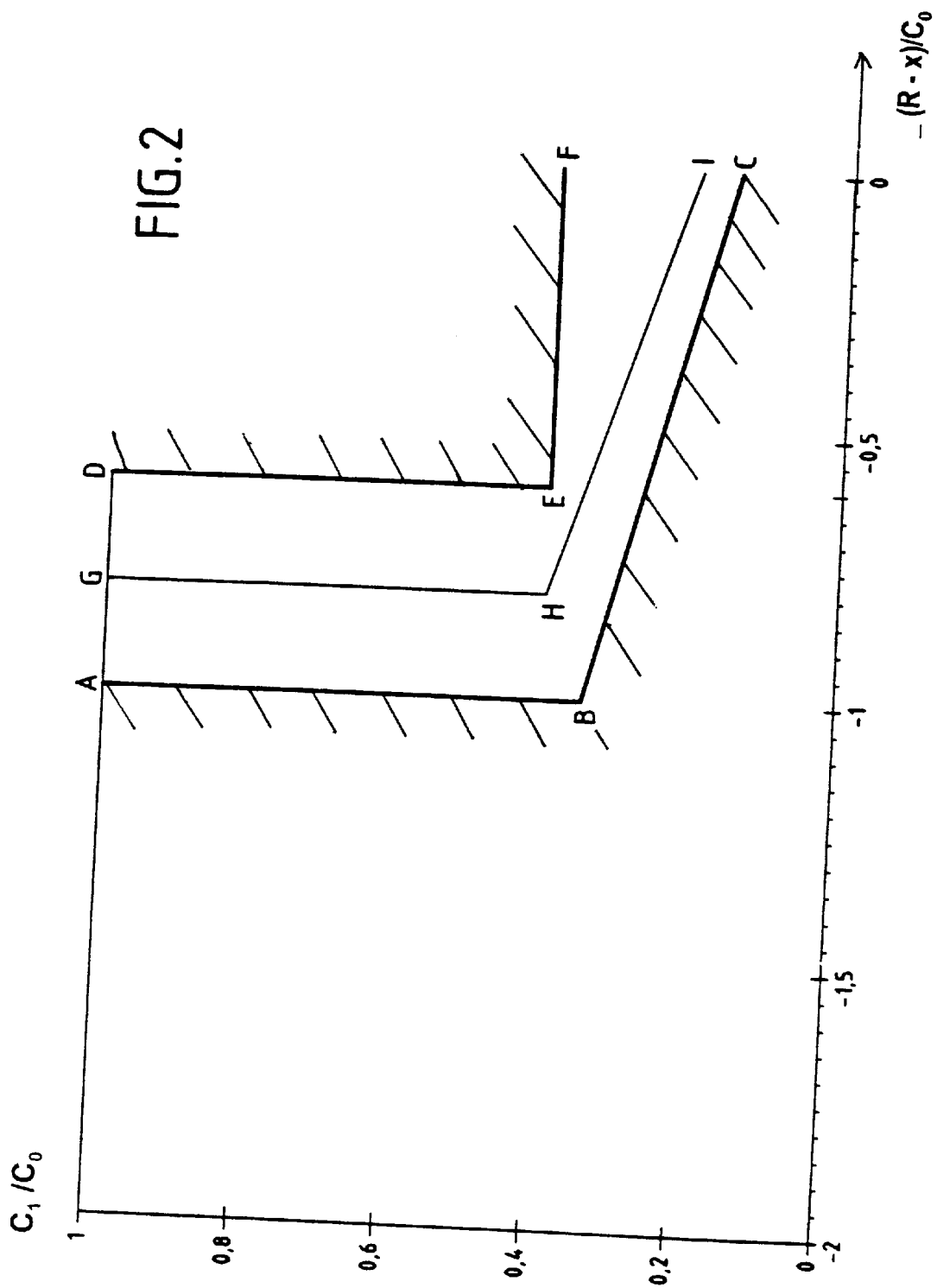
FIG. 2 is a diagram illustrating a preferred expression defining the chord, for the winglet of FIG. 1, and the upper and lower limits of said chord expression.

FIG. 2 illustrates a preferred expression defining the chord (line GHI) together with the upper and lower limits of the chord expression, beyond which the anti-noise efficiency would be compromised. The following table specifies the coordinates of the characteristic points:

| | Lower limit | | | Upper limit | | | Recommended shape | |
|---|---|---|---|---|---|---|---|---|
| point | (R-x)/$C_0$ | $C_1/C_0$ | point | (R-x)/$C_0$ | $C_1/C_0$ | point | (R-x)/$C_0$ | $C_1/C_0$ |
| A | 1.00 | 1.00 | D | 0.60 | 1.00 | G | 0.80 | 1.00 |
| B | 1.00 | 0.35 | E | 0.60 | 0.40 | H | 0.80 | 0.40 |
| C | 0.00 | 0.15 | F | 0.00 | 0.40 | I | 0.00 | 0.20 |

It will be noted that these values no longer relate to the "mean value of the chord" of the winglet 4, but to the decreasing "change" in the value of the chord $C_1$, generally linear, between the "root" of the winglet at the actual blade and the free tip of the winglet. Conversely, the "mean value of the chord" of the winglet can be readily deduced from the values in the above table. In any case, the abrupt variation in the chord at the aforementioned root, as shown by the vertical segments AB, GH and DE should also be noted.

Incidentally, the angle F at which the leading edge of the winglet is swept may be between 20° and 30°, backward (FIG. 3) or alternatively forward (FIG. 4). This feature is necessary in order to reduce the intensity of the shockwaves during high-speed flight, in order to limit the noise and improve the rotor performance. This angle must not, however, exceed a value which causes the formation of a horn-shaped vortex or apex vortex like those which occur on delta-wing airplanes: this type of very stable and concentrated vortex would cause intense interactions with the next blades.

Figure 5:
FIG. 5 is a diagram illustrating the expression defining the twist that can be applied to the blade according to the invention.

As can also be seen in FIG. 5, the expression defining the twist $\theta v$ associated with the winglet is linear, decreasing, and simply continues that of the internal part of the blade: there must be no point of discontinuity or of inflection where the chord changes. The total amplitude of the twist between the center of the rotor and the tip of the blade may be between $-8°$ and $-12°$.

To maintain good flow quality, the leading edge must also retain its continuity where the chord changes. This may advantageously be achieved as follows:

if $(y/c)_0$ and $(z/c)_0$ are the reduced coordinates of the profile chosen for the inside of the discontinuity of the chord, y being measured in the direction of the chord and z in the perpendicular direction (it being possible for the reduced coordinates to be defined by algebraic formulae or by a table of points), and if $c_0$ is the chord of profile 0, on the inside, and $C_1$ is the chord of profile 1, on the outside of the discontinuity, then the reduced coordinates of profile 1 will be defined from the coordinates of profile 0 by the following refined transform:

$$(y/c)_1 = (y/c)_0$$

$$(z/c)_1 = (z/c)_0 \sqrt{c_0/c_1}$$

This definition makes it possible to ensure the continuity of the leading edge radius:

$$r_1 = \frac{(z - z_{BA})_1^2}{2(y - y_{BA})_1}$$
$$= \frac{c_1(z/c - z_{BA}/c)_1^2}{2(y/c - y_{BA}/c_1)_1}$$
$$= \frac{c_1(c_0/c_1)(z/c - z_{BA}/c)_0^2}{2(y/c - y_{BA}/c)_0} = r_0$$

where BA stands for "leading edge".

FIGS. 6 and 7 show the result obtained for a profile on the inside (profile 0) of 9% relative thickness and a chord ratio $c_1/c_0$ of 0.4.

Acoustic measurements taken in a wind tunnel have demonstrated the efficiency of the invention in a broad flight envelope. Thus, compared with a conventional rectangular tip, and for the same aerodynamic thrust, the reduction in noise exceeds 2 dB for the optimization point (which corresponds to the most noisy descent conditions: a speed of 35 m/s, a descent slope of −6°), namely an approximately 40% reduction in the acoustic energy perceived by the ear. Incidentally, it would also seem that the advantages remain significant when the flight parameters vary: between 30 and 45 m/s for the speed, between −2° and −10° for the slope, and between 0.68 and 0.76 for the Mach number of the advancing blade, in particular.

What is claimed is:

1. A blade for a rotary wing aircraft, said blade comprising a main part of the blade having a chord $C_0$ and a blade tip winglet having a chord $C_1$, said blade tip winglet intended to reduce blade-vortex interaction noise during descending flight, wherein said winglet has, in plan view, an at least approximately trapezoidal shape, and wherein a mean value of said chord $C_1$ of the winglet is between 25% and 40% of said chord $C_0$ of the main part of the blade, wherein an expression defining a chord of said winglet based on a first coordinate $(R-x)/C_0$, in which R represents a total span of said winglet, and x represents a variable length along said span R, and a second coordinate $C_1/C_0$, has a lower limit at a point A at which $(R-x)/C_0$ is equal to 1.00 and $C_1/C_0$ is equal to 1.00; at a point B at which $(R-x)/C_0$ is equal to 1.00 and $C_1/C_0$ is equal to 0.35; and at a point C at which $(R-x)/C_0$ is equal to 0.00 and $C_1/C_0$ is equal to 0.15; and has an upper limit at a point D at which $(R-x)/C_0$ is equal to 0.60 and $C_1/C_0$ is equal to 1.00; at a point E at which $(R-x)/C_0$ is equal to 0.60 and $C_1/C_0$ is equal to 0.40; and at a point F at which $(R-x)/C_0$ is equal to 0.00 and $C_1/C_0$ is equal to 0.40.

2. The blade claimed in claim 1, wherein an angle at which a leading edge of said winglet is swept is between 20° and 30°.

3. The blade claimed in claim 2, wherein said angle at which the leading edge of the winglet is swept is a swept-forward angle.

4. The blade claimed in claim 2, wherein said angle at which the leading edge of the winglet is swept is a swept-back angle.

5. The blade claimed in claim 1, wherein an expression of defining a twist associated with said winglet is linear, decreasing, and in continuation of that of an internal part of the blade.

6. The blade claimed in claim 1, wherein a leading edge of said blade including the winglet maintains its continuity at a point where the chord $C_0$, $C_1$ changes.

7. The blade claimed in claim 1, wherein said expression is defined by a point G at which $(R-x)/C_0$ is equal to 0.80 and $C_1/C_0$ is equal to 1.00; a point H at which $(R-x)/C_0$ is equal to 0.80 and $C_1/C_0$ is equal to 0.40; and a point I at which $(R-x)/C_0$ is equal to 0.00 and $C_1/C_0$ is equal to 0.20.

* * * * *